United States Patent
Kobayashi et al.

(10) Patent No.: US 9,838,735 B2
(45) Date of Patent: Dec. 5, 2017

(54) PREVENTION OF ERRONEOUS DETECTION OF SIGNAL

(71) Applicant: SONY CORPORATION, Tokyo (JP)

(72) Inventors: Kenichi Kobayashi, Tokyo (JP); Hiroyuki Kamata, Kanagawa (JP); Takuya Okamoto, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/783,500

(22) PCT Filed: Apr. 3, 2014

(86) PCT No.: PCT/JP2014/059816
§ 371 (c)(1),
(2) Date: Oct. 9, 2015

(87) PCT Pub. No.: WO2014/171341
PCT Pub. Date: Oct. 23, 2014

(65) Prior Publication Data
US 2016/0066017 A1    Mar. 3, 2016

(30) Foreign Application Priority Data
Apr. 15, 2013   (JP) ................................ 2013-084570

(51) Int. Cl.
*H04N 7/173*   (2011.01)
*H04N 21/435*   (2011.01)
(Continued)

(52) U.S. Cl.
CPC ............. *H04N 21/435* (2013.01); *H04L 1/00* (2013.01); *H04L 1/20* (2013.01); *H04L 27/2613* (2013.01);
(Continued)

(58) Field of Classification Search
None
See application file for complete search history.

(56) References Cited

U.S. PATENT DOCUMENTS

2004/0166823 A1 *   8/2004   Alderton .................. H04B 1/40
455/250.1
2006/0114812 A1 *   6/2006   Kim ...................... H04L 5/0023
370/206
(Continued)

FOREIGN PATENT DOCUMENTS

JP     2000-341244 A    12/2000
JP     2001-217802 A     8/2001
(Continued)

*Primary Examiner* — William J Kim
(74) *Attorney, Agent, or Firm* — Chip Law Group

(57) ABSTRACT

The present technology relates to a reception device, reception method, and program that can prevent erroneous detection of a predetermined signal, such as a P1 signal, included in, for example, a received signal such as DVB-T2.

A correlation calculation unit obtains a correlation value between received signals including a predetermined signal in which an original signal and a duplicate signal obtained from a copy of at least a part of the original signal are disposed. An average power calculation unit obtains average power of the received signals. A normalization unit obtains a normalized correlation value obtained by normalizing the correlation value by the average power. The present technology can be applied to a case where a P1 signal being a preamble signal is detected from a received signal such as DVB-T2, for example.

8 Claims, 14 Drawing Sheets

(51) Int. Cl.
*H04L 1/00* (2006.01)
*H04N 21/434* (2011.01)
*H04N 21/61* (2011.01)
*H04L 1/20* (2006.01)
*H04L 27/26* (2006.01)

(52) U.S. Cl.
CPC ....... *H04L 27/2656* (2013.01); *H04N 21/434* (2013.01); *H04N 21/6112* (2013.01)

(56) References Cited

U.S. PATENT DOCUMENTS

| | | | |
|---|---|---|---|
| 2008/0089443 A1* | 4/2008 | Sanada | H04L 27/2675 375/319 |
| 2010/0040135 A1* | 2/2010 | Yoon | G10L 19/018 375/240.01 |
| 2011/0099445 A1* | 4/2011 | Goto | H04L 27/2656 714/746 |
| 2012/0099660 A1* | 4/2012 | Mun | H04L 29/00 375/240.27 |

FOREIGN PATENT DOCUMENTS

| | | |
|---|---|---|
| JP | 2004-222207 A | 8/2004 |
| JP | 2006-507753 A | 3/2006 |
| JP | 2011-097244 A | 5/2011 |

* cited by examiner

PREVENTION OF ERRONEOUS DETECTION OF SIGNAL

TECHNICAL FIELD

The present technology relates a reception device, a reception method, and a program, and more particularly, for example, to a reception device, a reception method, and a program capable of preventing erroneous detection of a predetermined signal included in a received signal.

BACKGROUND ART

As a terrestrial digital broadcast standard, for example, there is Digital Video Broadcasting-Terrestrial 2 (DVB-T2). In DVB-T2, a modulation scheme called an orthogonal frequency division multiplexing (OFDM) scheme is used.

In the OFDM scheme, digital modulation such as phase shift keying (PSK) or quadrature amplitude modulation (QAM) is performed by providing several orthogonal subcarriers in transfer bands and allocating data to amplitudes and phases of the respective subcarriers.

As kinds of frames of digital signals in conformity with DVB-T2 (hereinafter also referred to as DVB-T2 signals), there are frames in conformity with DVB-T2 (hereinafter also referred to as T2 frames) and frames in conformity with standards to be regulated in the future (hereinafter also referred to as future extension frame (FEF) parts) other than DVB-T2.

A P1 signal which is a preamble is disposed at the beginning of each frame of a DVB-T2 signal.

In a T2 frame of the frames of the DVB-T2 signal, a P2 signal which is a preamble and a data signal which is a payload (user data) are disposed after the P1 signal.

Here, the P1 signal includes S1 and S2 signals. The S1 and S2 signals include a fast Fourier transform (FFT) size of a frame, communication scheme information indicating whether a communication scheme is multiple input single output (MISO) or single input single output (SISO), and type information indicating whether the frame is an FEF part.

Accordingly, since the P1 signal (the S1 and S2 signals included in the P1 signal) indicates information of a frame in which the P1 signal is included (disposed), a reception device receiving a DVB-T2 signal first detects the P1 signal from a received signal obtained by receiving the DVB-T2 signal and instantly decodes (demodulates) the P1 signal.

When a T2 frame and an FEF part are present together in a DVB-T2 signal, a reception device decoding the T2 frame (hereinafter also referred to as a T2 reception device) among reception devices receiving the DVB-T2 signal extracts and decodes only the T2 frame included in the received signal based on the type information included in a P1 signal detected from a received signal obtained by receiving the DVB-T2 signal in which the T2 frame and the FEF part are present together.

Incidentally, since there is no rule regarding content of the FEF part in the DVB-T2, it is not known which signal is disposed in the FEF part.

Accordingly, when a T2 reception device has an automatic gain control (AGC) function, there is a concern of a gain of the AGC function following a level (power) of an FEF part in a section of the FEF part (the gain of the AGC being controlled so that the power of the FEF part becomes predetermined power) and affecting a section of the T2 frame (a received signal of the T2 frame).

Thus, in the DVB-T2 Implementation Guidelines (Non-Patent Literature 1), it is proposed that the AGC function be stopped in a section of an FEF part and a gain be held at a constant value immediately before the stop.

CITATION LIST

Patent Literature

Non-Patent Literature 1: DVB-T2 Implementation Guidelines BlueBook A133(IG) p 173 10.4. 2.6 FEFs

SUMMARY OF INVENTION

Technical Problem

Incidentally, from reception of a DVB-T2 signal to decoding of a P1 signal in a T2 reception device, there is a delay time to some extent.

For this reason, since it is difficult to stop the AGC function accurately in a section of an FEF part in some cases, a gain of the AGC function sometimes follows a level of the FEF part in a small section after start of the section of the FEF part (a small section immediately after a P1 signal at the beginning of the FEF part).

In this case, when the level of the FEF part is considerably different from a level of a T2 frame, the level of the T2 frame is considerably large or small at the beginning of the T2 frame immediately after the FEF part, and thus there is a concern of the P1 signal disposed at the beginning of the T2 frame being erroneously detected.

The present technology is devised in view of such circumstances and, for example, prevents erroneous detection of a predetermined signal, such as a P1 signal, included in, for example, a received signal such as DVB-T2.

Solution to Problem

A reception device or program according to the present technology is a reception device including: a correlation calculation unit configured to obtain a correlation value between received signals including a predetermined signal in which an original signal and a duplicate signal obtained from a copy of at least a part of the original signal are disposed; an average power calculation unit configured to obtain average power of the received signals; and a normalization unit configured to obtain a normalized correlation value obtained by normalizing the correlation value by the average power, or a program causing a computer to function as such a reception device.

A reception method according to the present technology is a reception method including: a correlation calculation step of obtaining a correlation value between received signals including a predetermined signal in which an original signal and a duplicate signal obtained from a copy of at least a part of the original signal are disposed; an average power calculation step of obtaining average power of the received signals; and a normalization step of obtaining a normalized correlation value obtained by normalizing the correlation value by the average power.

In the above-described present technology, a correlation value between received signals including a predetermined signal in which an original signal and a duplicate signal obtained from a copy of at least a part of the original signal are disposed is obtained, average power of the received signals is calculated, and a normalized correlation value obtained by normalizing the correlation value by the average power is obtained.

Note that, the reception device may be an independent device or an inner block constituting one device.

Also, the program may be provided by being transmitted via a transmission medium or by being recorded on a recording medium.

Advantageous Effects of Invention

According to an embodiment of the present technology, it is possible to prevent erroneous detection. In particular, it is possible to prevent erroneous detection of a predetermined signal included in, for example, a received signal.

The advantageous effects described in the present specification are merely exemplary and the advantageous effects of the present technology are not limited to the advantageous effects described in the present specification, but there may be additional advantageous effects.

DESCRIPTION OF EMBODIMENTS

<Embodiment of Transfer System to which the Present Technology is Applied>

Figure 1:
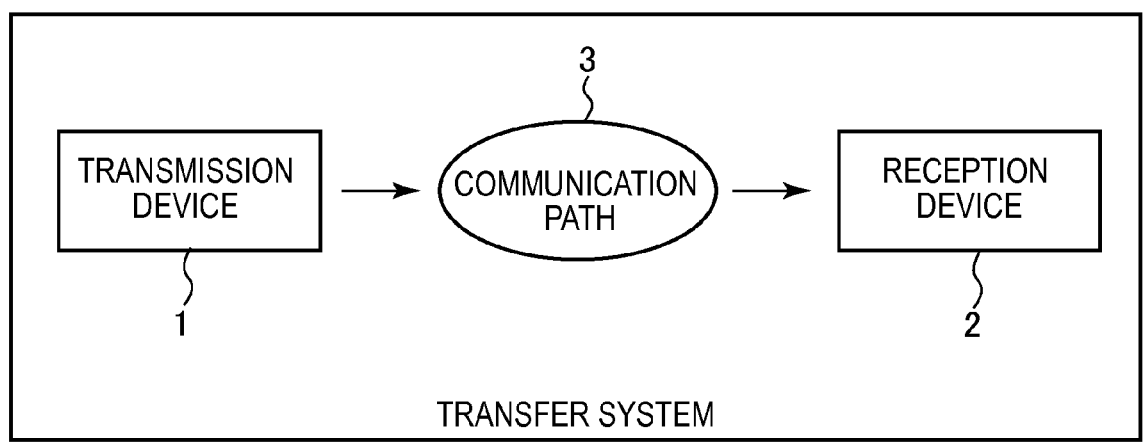
FIG. 1 is a block diagram illustrating a configuration example of an embodiment of a transfer system to which the present technology is applied.

FIG. 1 is a block diagram illustrating a configuration example of an embodiment of a transfer system (a system refers to a logical collective of a plurality of devices, and the respective included devices may or may not be in the same casing) to which the present technology is applied.

In FIG. 1, the transfer system includes a transfer device 1 and a reception device 2.

For example, the transmission device 1 transmits (broadcasts) (transfers) a program of television broadcast via, for example, a communication path 3 such as a satellite line, ground waves, or a cable (wired line).

That is, the transmission device 1 is a transmission device in conformity with, for example, DVB-T2 and transmits image data, audio data, or the like as a program using a DVB-T2 signal which is transmission target data to be transmitted. Here, when the transmission device 1 is a transmission device in conformity with DVB-T2, the communication path 3 is ground waves.

The reception device 2 receives a signal transmitted from the transmission device 1 via the communication path 3, decodes (demodulates) the received signal obtained by receiving the signal, and outputs the decoded signal.

That is, the reception device 2 is, for example, a TV (television receiver) which is a T2 reception device in conformity with, for example, DVB-T2. The reception device 2 receives the DVB-T2 signal transmitted from the transmission device 1 via the communication path 3, decodes a T2 frame included in the received signal obtained by receiving the DVB-T2 signal into image data, audio data, or the like as the original transmission target data, and outputs the image data, the audio data, or the like.

<DVB-T2 Signal>

Figure 2:
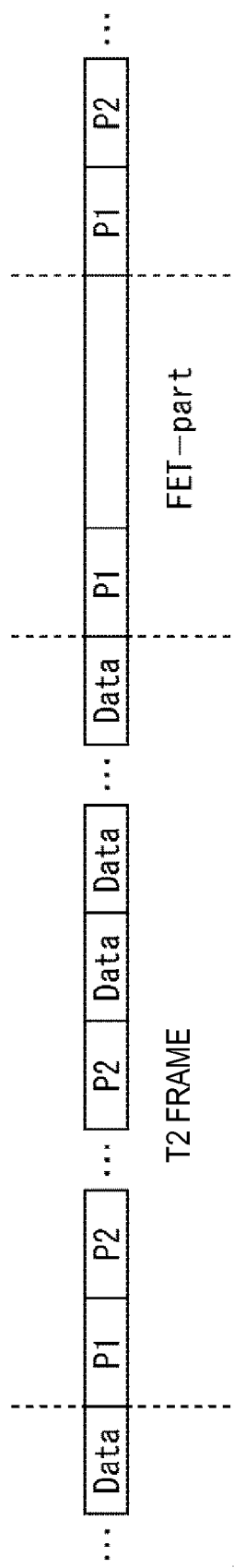
FIG. 2 is a diagram illustrating an example of the format of a DVB-T2 signal transmitted by a transmission device 1.

FIG. 2 is a diagram illustrating an example of the format of the DVB-T2 signal transmitted by the transmission device 1 in FIG. 1.

The DVB-T2 signal is configured to include a plurality of frames.

As the frames of the DVB-T2, as described above, there are a T2 frame and an FEF part.

A P1 signal which is a preamble is disposed at the beginning of each frame of the DVB-T2 signal.

In the T2 frame among the frames of the DVB-T2 signal, a P2 signal which is a preamble and a data signal (Data) which is a payload are disposed after the P1 signal.

<Configuration Example of Transmission Device 1>

Figure 3:
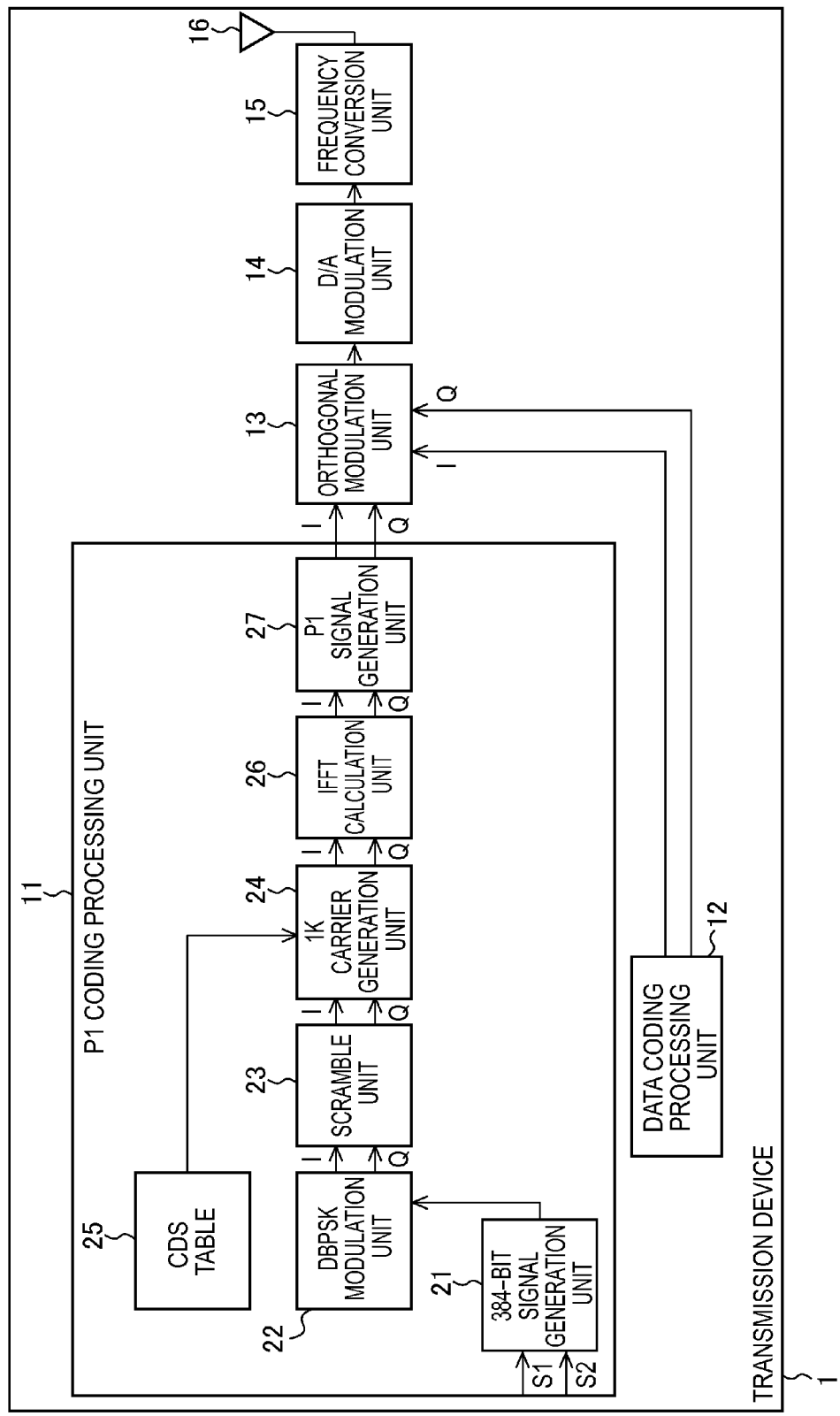
FIG. 3 is a block diagram illustrating a configuration example of the transmission device 1.

FIG. 3 is a block diagram illustrating a configuration example of the transmission device 1 in FIG. 1.

In FIG. 3, the transmission device 1 includes a P1 coding processing unit 11, a data coding processing unit 12, an orthogonal modulation unit 13, a digital-to-analog (D-to-A) modulation unit 14, a frequency conversion unit 15, and an antenna 16.

The P1 coding processing unit 11 includes a 384-bit signal generation unit 21, a differential binary phase shift keying (DBPSK) modulation unit 22, a scramble unit 23, a 1K carrier generation unit 24, a carrier distribution sequence (CDS) table 25, an inverse fast Fourier transform (IFFT) calculation unit 26, and a P1 signal generation unit 27. The P1 coding processing unit 11 generates a P1 signal (predetermined signal).

The 384-bit signal generation unit 21 is supplied with an FFT size of a frame, communication scheme information, and S1 and S2 signals indicating type information.

The 384-bit signal generation unit 21 generates a 384-bit signal by mapping the S1 and S2 signals to a predetermined 0 and 1 series formed by 0 and 1 and supplies the 384-bit signal to the DBPSK modulation unit 22.

The DBPSK modulation unit 22 performs DBPSK modulation on the 384-bit signal from the 384-bit signal generation unit 21 and supplies a DBPSK modulation signal formed by I and Q components obtained as the result to the scramble unit 23.

The scramble unit 23 encrypts the DBPSK modulation signal supplied from the DBPSK modulation unit 22 to form an M series (performs an exclusive OR operation with the M series) and supplies the encrypted DBPSK modulation signal to the 1K carrier generation unit 24.

The 1K carrier generation unit 24 reads an effective carrier number stored in the CDS table 25. The 1K carrier generation unit 24 maps the DBPSK modulation signal from the scramble unit 23 and formed by I and Q components to subcarriers which are 384 effective carriers among 1K (1024) subcarriers with reference to effective carrier numbers read from the CDS table 25, and then supplies a 1K signal formed by I and Q components as 1K subcarriers after the mapping to the IFFT calculation unit 26.

The CDS table 25 stores numbers (effective carrier numbers) of effective carriers which are effective carriers among the 1K subcarriers.

The IFFT calculation unit 26 converts the 1K signal of a frequency domain into an IFFT signal which is a 1K signal of the time domain and is formed by I and Q components by performing IFFT calculation on the 1K signal formed by I and Q components and supplied from the 1K carrier generation unit 24, and then supplies the IFFT signal to the P1 signal generation unit 27.

The P1 signal generation unit 27 generates a P1 signal formed by I and Q components using the 1K signal of the time domain which is the IFFT signal supplied from the IFFT calculation unit 26 as an origin signal which is the original signal of the P1 signal, and then supplies the P1 signal to the orthogonal modulation unit 13.

That is, the P1 signal generation unit 27 appropriately disposes the 1K signal (original signal) from the IFFT calculation unit 26, a first duplicate signal obtained by copying a part of the 1K signal, and a second duplicate signal obtained by copying the remaining part of the 1K signal to generate the P1 signal in which the first duplicate signal, the 1K signal, and the second duplicate signal are disposed in this order.

A signal indicating a frame size or the like, transmission target data, or the like is supplied from the outside to the data coding processing unit 12.

The data coding processing unit 12 generates the I and Q components of the P2 signal or the data signal by performing encoding processes such as encryption, mapping, and IFFT calculation on the signal indicating the frame size or the like, the transmission target data, or the like from the outside, and then supplies the I and Q components to the orthogonal modulation unit 13.

The orthogonal modulation unit 13 forms the T2 frame in which the P1 signal supplied form the P1 signal generation unit 27 and the P2 signal or the data signal supplied from the data coding processing unit 12 are appropriately disposed and generates a DVB-T2 signal including the T2 frame. Then, the orthogonal modulation unit 13 performs orthogonal modulation on the DVB-T2 signal and supplies the DVB-T2 signal obtained as the result of the orthogonal modulation to the D-to-A conversion unit 14.

The D-to-A conversion unit 14 performs D-to-A conversion on the DVB-T2 signal from the orthogonal modulation unit 13 and supplies an analog DVB-T2 signal obtained as the result to the frequency conversion unit 15.

The frequency conversion unit 15 performs frequency conversion on the DVB-T2 signal from the D-to-A conversion unit 14 and supplies a radio frequency (RF) signal obtained as the result to the antenna 16.

The antenna 16 transmits (radiates) the RF signal from the frequency conversion unit 15 as radio waves.

In the transmission device 1 having such a configuration, the P1 coding processing unit 11 generates the P1 signal (predetermined signal) and supplies the P1 signal to the orthogonal modulation unit 13.

The data coding processing unit 12 generates the P2 signal or the data signal by performing the coding process on the transmission target data or the like from the outside and supplies the P2 signal or the like to the orthogonal modulation unit 13.

The orthogonal modulation unit 13 generates the DVB-T2 signal from the P1 signal from the P1 signal generation unit 27 and the P2 signal or the data signal from the data coding processing unit 12 and performs the orthogonal modulation on the DVB-T2.

In the orthogonal modulation unit 13, the DVB-T2 signal obtained as the result of the orthogonal modulation is supplied to the frequency conversion unit 15 via the D-to-A conversion unit 14, is subjected to frequency conversion to be converted into the RF signal, and is subsequently transmitted via the antenna 16.

<Effective Carriers of 1K Signal>

Figure 4:
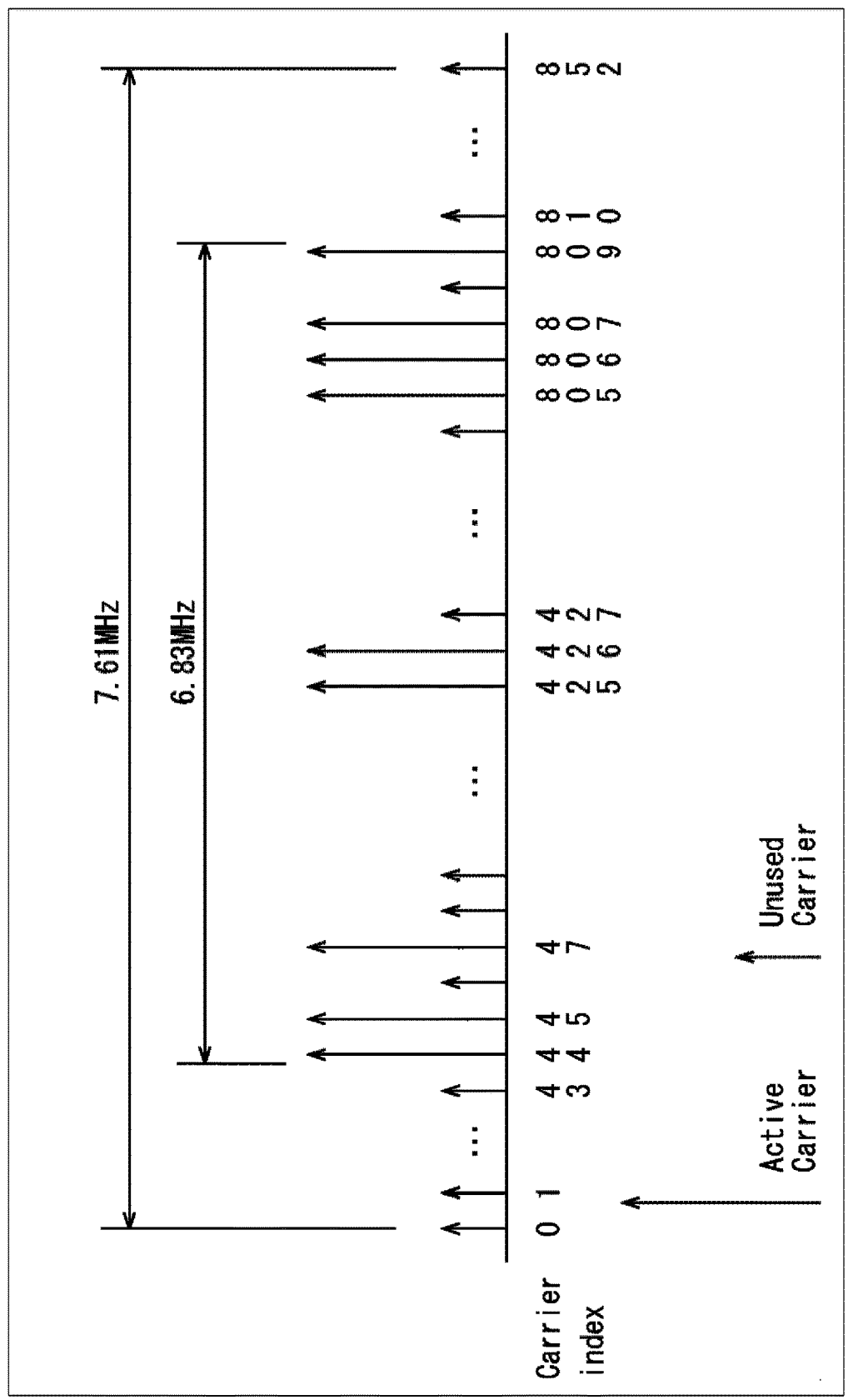
FIG. 4 is an explanatory diagram illustrating information transmission carriers among subcarriers of a 1K signal generated by a 1K carrier generation unit 24.

FIG. 4 is an explanatory diagram illustrating information transmission carriers among 1K subcarriers of the 1K signal generated by the 1K carrier generation unit 24 in FIG. 3.

In the DVB-T2, 853 subcarriers among the 1K subcarriers of the 1K signal are allocated to the information transmission carriers for transmitting information.

In the DVB-T2, 384 information transmission carriers among the 853 information transmission carriers are allocated to effective carriers and the 384 effective carriers are used to actually transmit information.

In FIG. 4, longer arrows indicate the 384 effective carriers among the 853 information transmission carriers and shorter arrows indicate information transmission carriers other than the effective carriers.

<Configuration Example of P1 Signal>

Figure 5:
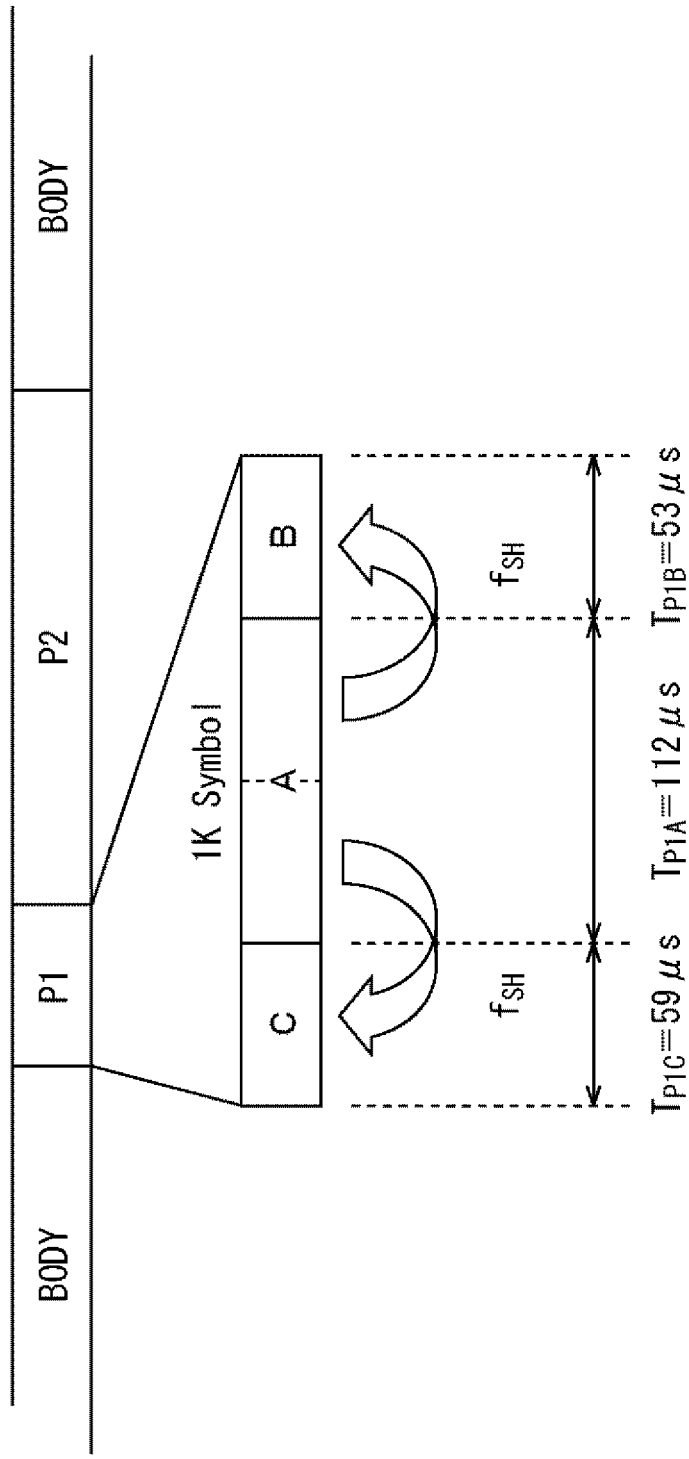
FIG. 5 is a diagram illustrating a configuration example of a P1 signal.

FIG. 5 is a diagram illustrating a configuration example of a P1 signal.

The P1 signal has a structure called a C-A-B structure, as illustrated in FIG. 5.

The P1 signal has an actual information portion A (original signal) which is a symbol of the 1K signal, a duplicate portion C which is the first duplicate signal obtained by copying a part of the beginning side of the actual information portion A, and a duplicate portion B which is the second duplicate signal obtained by copying the remaining part of the actual information portion A.

In the P1 signal, the duplicate portion C is disposed at a position adjacent before the actual information portion A (in a temporally preceding direction) and the duplicate portion B is disposed at a position adjacent after the actual information portion B (a temporally following direction).

The actual information portion A which is the symbol of the 1K signal includes 1K=1024 samples (I and Q components of 1K), the duplicate portion C is a signal obtained by copying 542 samples on the beginning side of the actual information portion A of the 1024 samples, and the duplicate portion B is a signal obtained by copying the 482 remaining samples of the actual information portion A of the 1024 samples.

As described above, the 1K signal includes the actual information portion A with a length (the number of samples) $T_r$ of 1024 samples, the duplicate portion C with a length $T_c$ of 542 samples, and the duplicate portion B with a length $T_b$ of 482 samples. Therefore, the 1K signal has a length of 2048 samples.

Accordingly, when a length (time) $T_{P1A}$ of the 1K signal is, for example, 112 μs (microseconds), a length $T_{P1C}$ of the duplicate portion C is 59 μs and a length $T_{P1B}$ of the duplicate portion B is 53 μs.

The duplicate portion C is configured as a signal in which a copy of a part of the actual information portion A on the beginning side is subjected to a frequency shift to be higher by a predetermined frequency $f_{sh}$, and the duplicate portion B is configured as a signal in which a copy of the remaining part of the actual information portion A is subjected to a frequency shift to be higher by the predetermined frequency $f_{sh}$.

Here, the duplicate portion C may not be the signal in which the copy of the part of the actual information portion A on the beginning side is subjected to a frequency shift to be higher by the predetermined frequency $f_{sh}$, but the copy of the part of the actual information portion A on the beginning side itself can be adopted. However, when the signal in which the copy of the part of the actual information portion A on the beginning side is subjected to a frequency shift to be higher by the predetermined frequency $f_{sh}$ is adopted, for example, tolerance of the duplicate portion C against interference with a specific frequency can be improved more than when the copy of the part of the actual information portion A on the beginning side itself can be adopted.

The above-described points also apply to the duplicate portion B.

<Configuration Example of Reception Device 2>

Figure 6:
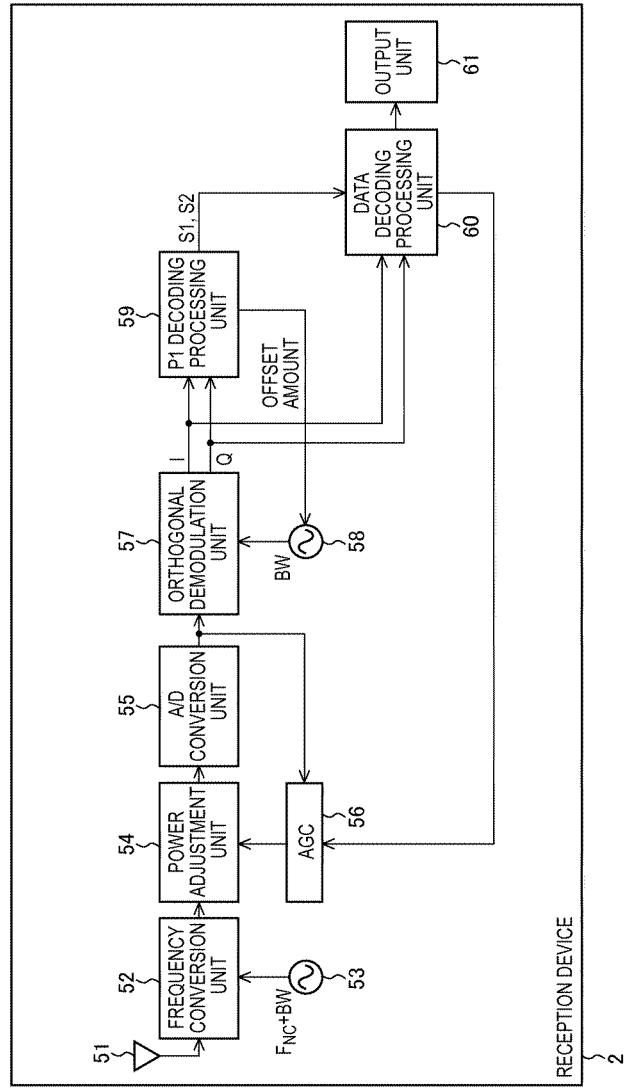
FIG. 6 is a block diagram illustrating a configuration example of a reception device 2.

FIG. 6 is a block diagram illustrating a configuration example of the reception device 2 in FIG. 1.

In FIG. 6, the reception device 2 includes an antenna 51, a frequency conversion unit 52, a local oscillation unit 53, a power adjustment unit 54, an analog-to-digital (A-to-D) conversion unit 55, an AGC 56, an orthogonal demodulation unit 57, a local oscillation unit 58, a P1 decoding processing unit 59, a data decoding processing unit 60, and an output unit 61.

The antenna 51 receives (acquires) the RF signal of the DVB-T2 signal transmitted from the transmission device 1 in FIG. 3 and supplies the received signal which is the RF signal to the frequency conversion unit 52.

The frequency conversion unit 52 is supplied with the received signal (the RF signal) from the antenna 51 and is supplied with carrier waves with an oscillation frequency FNC+BW from the local oscillation unit 53.

The frequency conversion unit 52 converts the received signal which is the RF signal into an intermediate frequency (IF) signal with a center frequency FNC by multiplying the received signal (the RF signal) supplied from the antenna 51 by the carrier waves with the oscillation frequency FNC+BW supplied from the local oscillation unit 53, and then supplies the intermediate frequency signal to the power adjustment unit 54.

The local oscillation unit 53 generates the carrier waves (reproduced carrier) with the oscillation frequency FNC+BW and supplies the carrier wave to the frequency conversion unit 52.

The power adjustment unit 54 is supplied with the IF signal from the frequency conversion unit 52 and is supplied with a power adjustment gain from the AGC 56.

The power adjustment unit 54 adjusts power of the IF signal from the frequency conversion unit 52 according to the gain supplied from the AGC 56 and supplies the IF signal of which the power is adjusted to the A-to-D conversion unit 54.

The A-to-D conversion unit 55 performs A-to-D conversion on the IF signal supplied from the power adjustment unit 54 and supplies the digital IF signal obtained as the result to the AGC 56 and the orthogonal demodulation unit 57.

The AGC 56 obtains a gain for holding the power of the IF signal at a predetermined constant value based on the IF signal supplied from the A-to-D conversion unit 55 and supplies the gain to the power adjustment unit 54. Thus, the AGC 56 controls the power adjustment unit 54 so that the power of the IF signal supplied from the A-to-D conversion unit 55 is held at the predetermined constant value.

The orthogonal demodulation unit 57 is supplied with the IF signal from the A-to-D conversion unit 55 and is supplied with the carrier waves with the oscillation frequency BW or the like from the local oscillation unit 58.

The orthogonal demodulation unit 57 performs orthogonal demodulation on the IF signal supplied from the A-to-D conversion unit 55 using the carrier waves with the oscillation frequency BW or the like supplied from the local oscillation unit 58 and supplies a demodulated signal (received signal) obtained as the result of the orthogonal demodulation and formed by I and Q components to the P1 decoding processing unit 59 and the data decoding processing unit 60.

The local oscillation unit 58 generates the carrier waves with the oscillation frequency BW and supplies the carrier waves to the orthogonal demodulation unit 57.

Here, the P1 decoding processing unit 59 supplies the local oscillation unit 58 with a coarse offset Foffset which is an offset amount of a carrier frequency in units of subcarriers.

The local oscillation unit 58 changes the oscillation frequency BW into a frequency BW+Foffset according to the coarse offset Foffset supplied from the P1 decoding processing unit 59. Thus, a frequency error of the demodulated signal which is output by the orthogonal demodulation unit 57 and occurring in units of subcarriers is corrected.

When the oscillation frequency of the local oscillation unit 58 is changed into the frequency BW+Foffset, the oscillation frequency of the local oscillation unit 53 is also changed into a frequency FNC+BW+Foffset.

The P1 decoding processing unit 59 detects the P1 signal from the demodulated signal supplied from the orthogonal demodulation unit 57 and decodes the P1 signal. The S1 and S2 signals obtained by decoding the P1 signal in the P1 decoding processing unit 59 and included in the P1 signal are supplied from the P1 decoding processing unit 59 to the data decoding processing unit 60.

The P1 decoding processing unit 59 obtains the coarse offset Foffset from the demodulated signal supplied from the orthogonal demodulation unit 57 and supplies the coarse offset Foffset to the local oscillation unit 58.

The data decoding processing unit 60 recognizes that the demodulated signal supplied from the orthogonal demodulation unit 57 is one (demodulated signal) of the T2 frame and the FEF part, using the S1 and S2 signals from the P1 decoding processing unit 59.

When the demodulated signal from the orthogonal demodulation unit 57 is the T2 frame, the data decoding processing unit 60 decodes the P2 signal from the demodulated signal (the T2 frame) from the orthogonal demodulation unit 57 using the S1 and S2 signals from the P1 decoding processing unit 59. The data decoding processing unit 60 decodes the data signal from the demodulated signal supplied from the orthogonal demodulation unit 57 using the P2 signal and supplies the data signal to the output unit 61.

When the demodulated signal from the orthogonal demodulation unit 57 is the FEF part, for example, the data decoding processing unit 60 does not perform a process on the FEF part and stops the AGC 56 in the section of the FEF part by controlling the AGC 56 to hold the gain at a value immediately before the stop.

Thereafter, when the demodulated signal from the orthogonal demodulation unit 57 is the T2 frame, the data decoding processing unit 60 resumes the operation of the AGC 56 by performing the process on the T2 frame and controlling the AGC 56.

The output unit 61 processes the data signal from the data decoding processing unit 60 as necessary and outputs the processed data signal.

In the reception device 2 having such a configuration, the RF signal of the DVB-T2 signal transmitted from the transmission device 1 in FIG. 3 is received by the antenna 51, is converted into the IF signal via the frequency conversion unit 52, and is supplied to the power adjustment unit 54.

In the power adjustment unit 54, the power of the IF signal supplied thereto is adjusted under the control from the AGC 56, that is, according to the gain supplied from the AGC 56. The IF signal of which the power is adjusted is supplied to the AGC 56 and the orthogonal demodulation unit 57 via the A-to-D conversion unit 54.

In the AGC 56, the gain for holding the power of the IF signal at the predetermined constant value is obtained based on the IF signal supplied thereto and the power adjustment unit 54 is controlled according to the gain.

In the orthogonal demodulation unit 57, the IF signal supplied thereto is subjected to the orthogonal demodulation and the demodulated signal obtained as the result of the orthogonal demodulation is supplied to the P1 decoding processing unit 59 and the data decoding processing unit 60.

In the P1 decoding processing unit 59, the P1 signal is detected and decoded from the demodulated signal from the orthogonal demodulation unit 57, and the S1 and S2 signals included in the P1 signal are supplied to the data decoding processing unit 60.

In the data decoding processing unit 60, the P2 signal and the data signal are decoded from the demodulated signal from the orthogonal demodulation unit 57 using the S1 and S2 signals from the P1 decoding processing unit 59, and then are supplied to the output unit 61 as necessary.

The data decoding processing unit 60 recognizes that the received signal obtained from the S1 and S2 signals from the P1 decoding processing unit 59 by receiving the DVB-T2 signal from the transmission device 1 by the antenna 51 is one of the T2 frame and the FEF part.

When the data decoding processing unit 60 recognizes that the received signal is the FEF part, the data decoding processing unit 60 controls the AGC 56 according to, for example, DVB-T2 Implementation Guidelines (Non-Patent Literature 1) so that the gain is held at the value at that time in the section of the FEF part.

The holding of the gain of the AGC 56 is cancelled when the data decoding processing unit 60 recognizes that the received signal is the T2 frame from the S1 and S2 signals from the P1 decoding processing unit 59.

<Configuration Example of P1 Decoding Processing Unit 59>

Figure 7:
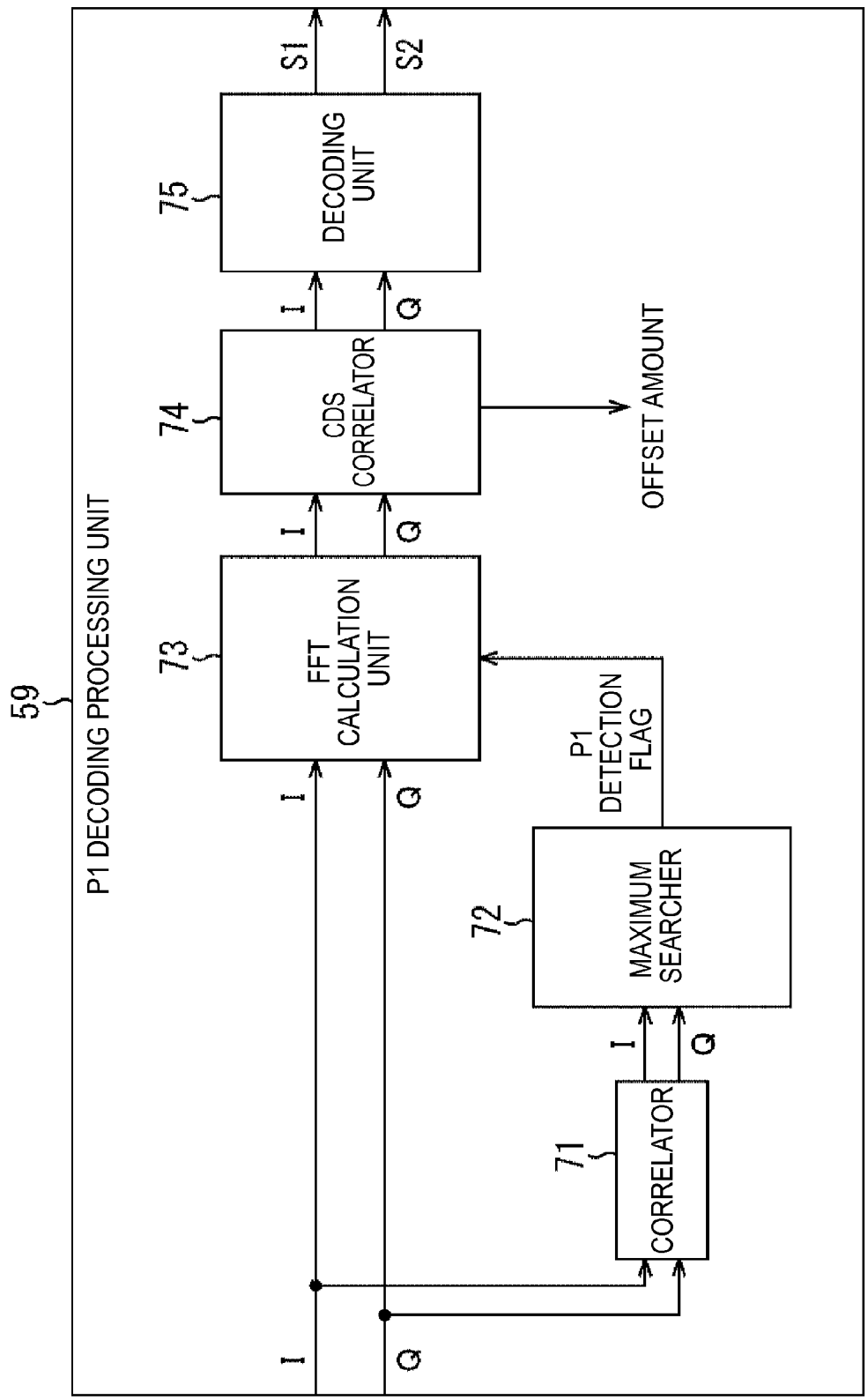
FIG. 7 is a block diagram illustrating a configuration example of a P1 decoding processing unit 59.

FIG. 7 is a block diagram illustrating a configuration example of the P1 decoding processing unit 59 in FIG. 6.

In FIG. 7, the P1 decoding processing unit 59 includes a correlator 71, a maximum searcher 72, an FFT calculation unit 73, a CDS correlator 74, and a decoding unit 75.

The correlator 71 is supplied with the demodulated signal formed by the I and Q components from the orthogonal demodulation unit 57 in FIG. 6.

The correlator 71 obtains a correlation value (a correlation value between the modulated signal and a signal in which a time (axis) of the demodulated signal is shifted) between the demodulated signals from the orthogonal demodulation unit 57 and supplies the correlation value to the maximum searcher 72.

The maximum searcher 72 detects the position of the demodulated signal of which the correlation value is the maximum as the position of the P1 signal based on the correlation value from the correlator 71 and supplies a P1 detection flag indicating the position of the P1 signal to the FFT calculation unit 73.

The FFT calculation unit 73 is supplied with the P1 detection flag from the maximum searcher 72 and is supplied with the demodulated signal from the orthogonal demodulation unit 57.

The FFT calculation unit 73 detects the P1 signal included in the demodulated signal from the orthogonal demodulation unit 57 based on the P1 detection flag from the maximum searcher 72, performs FFT calculation on the I and Q components of the 1024 samples of the 1K signal (the actual information portion A in FIG. 5) included in the P1 signal, and supplies the 1K signal of the frequency domain obtained as the result to the CDS correlator 74.

The FFT calculation unit 73 supplies a symbol start signal indicating start of the 1K signal of the frequency domain obtained as the result of the FFT calculation to the CDS correlator 74.

The CDS correlator 74 generates the 1K signal of the 1024 subcarriers in which the effective carriers are present at positions indicated by the effective carrier numbers, so to speak, as a basic 1K signal (virtually) with reference to the effective carrier numbers stored in a memory (not illustrated).

The CDS correlator 74 obtains correlation (hereinafter also referred to as CDS correlation) between the basic 1K signal and the 1K signal from the FFT calculation unit 73 while shifting the position of the basic 1K signal in units of subcarriers using a position indicated by the symbol start signal from the FFT calculation unit 73 as a criterion, and then recognizes the positions of the subcarriers (symbols) as 384 effective carriers in the 1K signal from the FFT calculation unit 73 based on the CDS correlation.

The CDS correlator 74 extracts the subcarriers (symbols) as the 384 effective carriers from the 1K signal from the FFT calculation unit 73 and supplies the subcarriers to the decoding unit 75.

The CDS correlator 74 obtains, as the coarse offset Foffset, a value corresponding to a shift amount of the position of the basic 1K signal when the CDS correlation is the maximum, based on the CDS correlation, and supplies the value to the local oscillation unit 58 (FIG. 6).

Here, as described with reference to FIG. 6, the local oscillation unit 58 changes the oscillation frequency BW into the frequency BW+Foffset according to the coarse offset Foffset supplied from the P1 decoding processing unit 59 (the CDS correlator 74 of the P1 decoding processing unit 59), so that the frequency error of the demodulated signal output by the orthogonal demodulation unit 57 and occurring in units of subcarriers is corrected.

The decoding unit 75 performs the decoding of the encryption, the DBPSK demodulation, the extraction of the S1 and S2 signals on the I and Q components of the 384 subcarriers (symbols) supplied from the CDS correlator 74, and then outputs the S1 and S2 signals obtained as the result to the data decoding processing unit 60 (FIG. 6) as the decoding result of the P1 signal.

Here, the decoding of the encryption in the decoding unit 75 refers to a process (exclusive OR operation with an M series) of decoding the encryption performed by the scramble unit 23 in FIG. 3. The DBPSK demodulation in the decoding unit 75 refers to a process of demodulating the DBPSK modulation performed by the DBPSK modulation unit 22 in FIG. 3. The extractions of the S1 and S2 signals in the decoding unit 75 refers to a process (a process of extracting the mapped information) of returning the mapping by the 384-bit signal generation unit 21 in FIG. 3 to the origin.

In the P1 decoding processing unit 59 having such a configuration, the correlator 71 obtains the correlation value between the demodulated signals from the orthogonal demodulation unit 57 and supplies the correlation value to the maximum searcher 72.

In the maximum searcher 72, the position of the P1 signal included in the demodulated signal from the orthogonal demodulation unit 57 is detected based on the correlation value from the correlator 71, and the P1 detection flag indicating the position of the P1 signal is supplied to the FFT calculation unit 73.

In the FFT calculation unit 73, the P1 signal included in the demodulated signal from the orthogonal demodulation unit 57 is detected based on the P1 detection flag from the maximum searcher 72, and the FFT calculation is performed on the 1K signal included in the P1 signal. The 1K signal of the frequency domain obtained as the result of the FFT calculation is supplied from the FFT calculation unit 73 to the CDS correlator 74 along with the symbol start signal indicating the start of the 1K signal.

In the CDS correlator 74, the CDS correlation is obtained using the 1K signal from the FFT calculation unit 73 and the symbol start signal. Then, in the CDS correlator 74, the coarse offset Foffset is obtained based on the CDS correlation and is supplied to the local oscillation unit 58 (FIG. 6).

In the CDS correlator 74, the subcarriers (symbols) are extracted as the 384 effective carriers from the 1K signal from the FFT calculation unit 73 based on the CDS correlation and are supplied to the decoding unit 75.

In the decoding unit 75, the S1 and S2 signals are extracted from the 384 subcarriers (symbols) from the CDS correlator 74 and are output to the data decoding processing unit 60 (FIG. 6).

In this way, in the P1 decoding processing unit 59, the P1 signal is detected from the demodulated signal from the orthogonal demodulation unit 57 and is decoded into the S1 and S2 signals.

<Configuration Example of Correlator 71>

Figure 8:
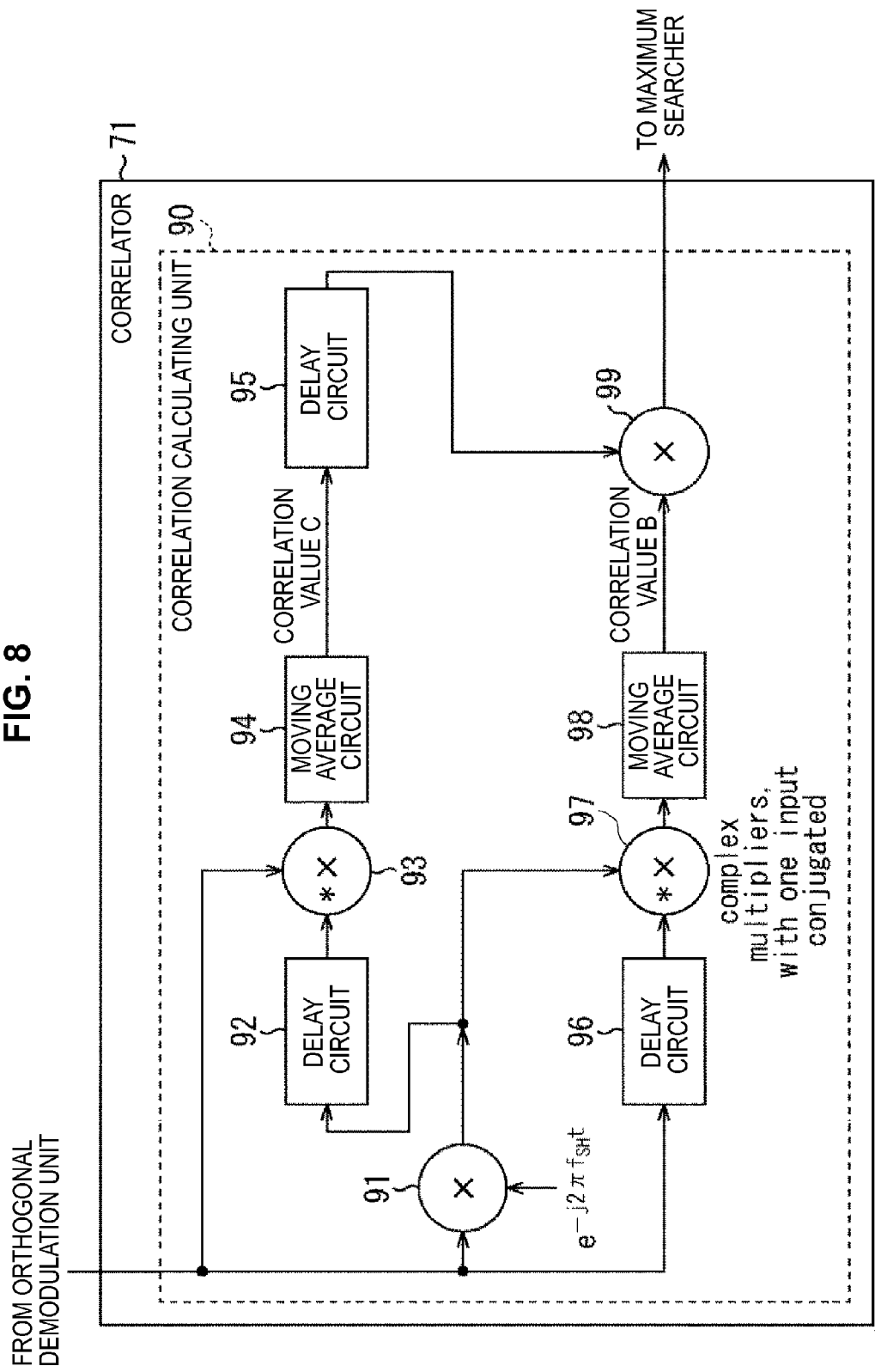
FIG. 8 is a block diagram illustrating a configuration example of a correlator 71.

FIG. 8 is a block diagram illustrating a configuration example of the correlator 71 in FIG. 7.

In FIG. 8, the correlator 71 includes a correlation calculation unit 90.

The correlation calculation unit 90 includes a frequency shifter 91, a delay circuit 92, a multiplier 93, a moving average circuit 94, a delay circuit 95, a delay circuit 96, a 97, a moving average circuit 98, and a multiplier 99.

The demodulated signal is supplied from the orthogonal demodulation unit 57 to the frequency shifter 91.

The frequency shifter 91 performs a frequency shift on the demodulated signal from the orthogonal demodulation unit 57 by multiplying the demodulated signal from the orthogonal demodulation unit 57 by $\exp\{-j2\pi f_{sh}t\}$ and supplies a modulated signal which is obtained as the result and of which a frequency is shifted to be lower by a frequency $f_{sh}$ (hereinafter also referred to as a frequency shift signal) to the delay circuit 92 and the multiplier 97. Further, $\exp\{x\}$ represents Napier's constant e to the power of x.

Here, the frequency of the duplicate portion C of the P1 signal (FIG. 5) included in the frequency shift signal is identical to the frequency of a part (a portion which is the original portion of the duplicate portion C) of the actual information portion A on the beginning side in the P1 signal included in the modulated signal. The frequency of the duplicate portion B of the P1 signal included in the frequency shift signal is also identical to the frequency of the remaining part (a portion which is the original portion of the duplicate portion B) of the actual information portion A of the P1 signal included in the demodulated signal.

The delay circuit 92 delays the frequency shift signal supplied from the frequency shifter 91 by the length $T_c$ of the duplicate portion C of the P1 signal and supplies the frequency shift signal to the multiplier 93.

The multiplier 93 is supplied with the frequency shift signal from the delay circuit 92 and is supplied with the demodulated signal from the orthogonal demodulation unit 57.

The multiplier 93 multiplies the demodulated signal which is the frequency shift signal (including the I and Q components) from the delay circuit 92 by the demodulated signal from the orthogonal demodulation unit 57, and then supplies a multiplied value obtained as the result to the moving average circuit 94.

Here, the multiplying performed by the multiplier 93 is multiplying of the demodulated signal including the I and Q components and the frequency shift signal similarly including the I and Q components, that is, multiplying of two complex numbers. In the multiplying, a complex conjugate is used as one complex number of the two complex numbers. The same also applies to multiplying of the multiplier 97 to be described below.

For example, the moving average circuit 94 obtains a moving average value of the multiplied values supplied from the multiplier 93 using about the length $T_r$ of the actual information portion A of the P1 signal as a window length for obtaining the moving average value, and then supplies the delay circuit 95 with the moving average value as a first correlation value (a correlation value between the demodulated signal and a signal subjected to a frequency shift of the demodulated signal and delayed by the time $T_c$) C between the demodulated signals.

The delay circuit 95 delays the first correlation value C supplied from the moving average circuit 94 by, for example, the length $T_r$ of the actual information portion A so that supply of the first correlation value C output by the delay circuit 95 and supply of a second correlation value B output by the moving average circuit 94 to the multiplier 99 simultaneously start, as will be described below, and then supplies the first correlation value C to the multiplier 99.

The delay circuit 96 is supplied with the demodulated signal from the orthogonal demodulation unit 57.

The delay circuit 96 delays the demodulated signal from the orthogonal demodulation unit 57 by the length $T_b$ of the duplicate portion B of the P1 signal and supplies the demodulated signal to the multiplier 97.

The multiplier 97 multiplies the demodulated signal from the delay circuit 96 by the demodulated signal which is the frequency shift signal from the frequency shifter 91, and then supplies a multiplied value obtained as the result to the moving average circuit 98.

The moving average circuit 98 obtains a moving average value of the multiplied values from the multiplier 97, as in the moving average circuit 94, and supplies the moving average value as the second correlation value (a correlation value between the demodulated signal and a signal subjected to a frequency shift of the demodulated signal and delayed by the time $T_b$) B between the demodulated signals to the multiplier 99.

The multiplier 99 multiplies the first correlation value C from the delay circuit 95 by the second correlation value B from the moving average circuit 98, and then obtains and outputs a multiplied value of the first correlation value C and the second correlation value B as a correlation value (a correlation value between the demodulated signal and a signal delayed by a time of the demodulated signal) (hereinafter also referred to as a simple correlation value) between the demodulated signals output by the orthogonal demodulation unit 57.

The simple correlation value output by the multiplier 99 is supplied as a correlation value used to detect the position of the P1 signal included in the demodulated signal (hereinafter also referred to as a detection correlation value) in the maximum searcher 72 (FIG. 7) at the rear stage from the correlator 71 to the maximum searcher 72.

Figure 9:
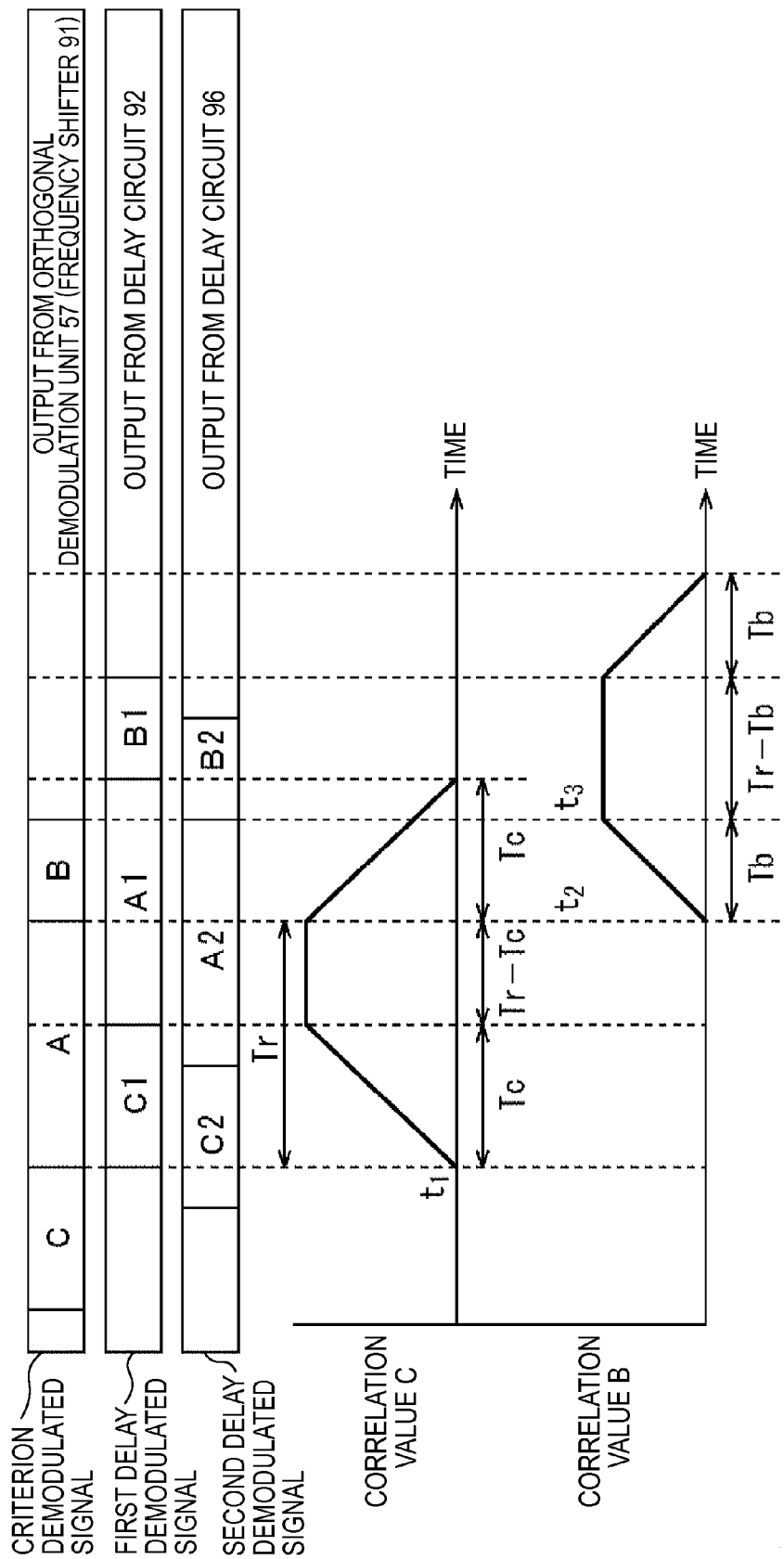
FIG. 9 is a diagram illustrating examples of a first correlation value B and a second correlation value C obtained by a correlation calculation unit 90.

FIG. 9 is a diagram illustrating examples of the first correlation value B and the second correlation value C obtained by the correlation calculation unit 90 in FIG. 8.

Here, a demodulated signal (a demodulated signal which is not delayed) output by the orthogonal demodulation unit 57 and the frequency shifter 91 is referred to as a criterion demodulated signal. A demodulated signal (a demodulated signal which is delayed by the length $T_c$ of the duplicate portion C) output by the delay circuit 92 is referred to as a first delay demodulated signal. A demodulated signal (a demodulated signal which is delayed by the length $T_b$ of the duplicate portion B) output by the delay circuit 96 is referred to as a second delay demodulated signal.

To facilitate the description in FIG. 9, the actual information portion A, the duplicate portion B, and the duplicate portion C of the P1 signal included in the first delay demodulated signal are referred to as an actual information portion A1, a duplicate portion B1, and a duplicate portion C1, respectively, and the actual information portion A, the duplicate portion B, and the duplicate portion C of the P1 signal included in the second delay demodulated signal are referred to as an actual information portion A2, a duplicate portion B2, and a duplicate portion C2, respectively.

For example, when the time axis of the criterion demodulated signal is a criterion, the P1 signal included in the first delay demodulated signal output by the delay circuit 92 starts from time $t_1$ at which the actual information portion A of the P1 signal included in the criterion demodulated signal output by the orthogonal demodulation unit 57 starts.

The frequencies of the duplicate portions C1 and B1 of the P1 signal included in the first delay demodulated signal output by the delay circuit 92 are identical to the frequency of the actual information portion A of the P1 signal included in the criterion demodulated signal output by the orthogonal demodulation unit 57.

For example, the first correlation value C which is a moving average value of a multiplied value of the criterion demodulated signal and the first delay demodulated signal described above, for which a window with the length $T_r$ of the actual information portion A of the P1 signal as a window length is used, is illustrated in FIG. 9.

That is, when a start edge of the window with the window length of the length $T_r$ to obtain the moving average value approaches time $t_1$ at which the P1 signal included in the criterion demodulated signal starts, the first correlation value C which is the moving average value increases at a slope corresponding to a multiplied value due to an influence of the multiplied value of the duplicate portion C1 of the P1 signal included in the first delay demodulated signal and the head of the actual information portion A of the P1 signal included in the criterion demodulated signal in which the copy is used to generate the duplicate portion C1.

The increase in the first correlation value C continues during the length (the number of samples) $T_c$ of the duplicate portion C from time $t_1$. Thereafter, the first correlation value C is (substantially) constant until the end edge of the window with the length $T_r$ approaches time $t_1$, that is, during the time (the number of samples) $T_r$-$T_c$.

When the end edge of the length $T_r$ approaches time $t_1$, an influence of a multiplied value of the duplicate portion C1 of the P1 signal included in the first delay demodulated signal and the head of the actual information portion A of the P1 signal included in the criterion demodulated signal in which the copy is used to generate the duplicate portion C1 decreases subsequently. Therefore, the first correlation value C which is the moving average value decreases at a slope corresponding to the multiplied value.

The decrease in the first correlation value C continues until the influence of the multiplied value of the duplicate portion C1 of the P1 signal included in the first delay demodulated signal and the head of the actual information portion A of the P1 signal included in the criterion demodulated signal in which the copy is used to generate the duplicate portion C1, that is, during the length $T_c$ of the duplicate portion C1.

On the other hand, the P1 signal included in the criterion demodulated signal output by the frequency shifter 91 ends at time $t_3$ at which the actual information portion A2 of the P1 signal included in the second delay demodulated signal output by the delay circuit 96 ends.

The frequencies of the duplicate portions C and B of the P1 signal included in the criterion demodulated signal output by the frequency shifter 91 are identical to the frequency of the actual information portion A2 of the P1 signal included in the second delay demodulated signal output by the delay circuit 96.

For example, the second correlation value B which is a moving average value of a multiplied value of the criterion demodulated signal and the second delay demodulated signal described above, for which a window with the length $T_r$ of the actual information portion A of the P1 signal as a window length is used, is illustrated in FIG. 9.

That is, when a start edge of the window with the window length of the length $T_r$ to obtain the moving average value approaches time $t_2$ at which the duplicate portion B of the P1 signal included in the criterion demodulated signal starts, time $t_2$ previous by the length $T_b$ of the duplicate portion B from time $t_3$ at which the P1 signal included in the criterion demodulated signal ends, the second correlation value B which is the moving average value increases at a slope corresponding to a multiplied value due to an influence of the multiplied value of the duplicate portion B of the P1 signal included in the criterion demodulated signal and the last of the actual information portion A2 of the P1 signal included in the second delay demodulated signal in which the copy is used to generate the duplicate portion B.

The increase in the second correlation value B continues during the length $T_b$ of the duplicate portion B from time $t_2$, that is, until time $t_3=t_2+T_b$. Thereafter, the second correlation value B is (substantially) constant until the end edge of the window with the length $T_r$ approaches time $t_2$, that is, during the time (the number of samples) $T_r$-$T_b$.

When the end edge of the window with the length $T_r$ approaches time $t_2$, an influence of a multiplied value of the duplicate portion B of the P1 signal included in the criterion demodulated signal and the last of the actual information portion A2 of the P1 signal included in the second delay demodulated signal in which the copy is used to generate the duplicate portion B decreases subsequently. Therefore, the second correlation value B which is the moving average value decreases at a slope corresponding to the multiplied value.

The decrease in the second correlation value B continues until the influence of the multiplied value of the duplicate portion B of the P1 signal included in the criterion demodulated signal and the last of the actual information portion A2 of the P1 signal included in the second delay demodulated signal in which the copy is used to generate the duplicate portion B disappears, that is, the decrease in the second correlation value B continues during the length $T_b$ of the duplicate portion B.

Figure 10:
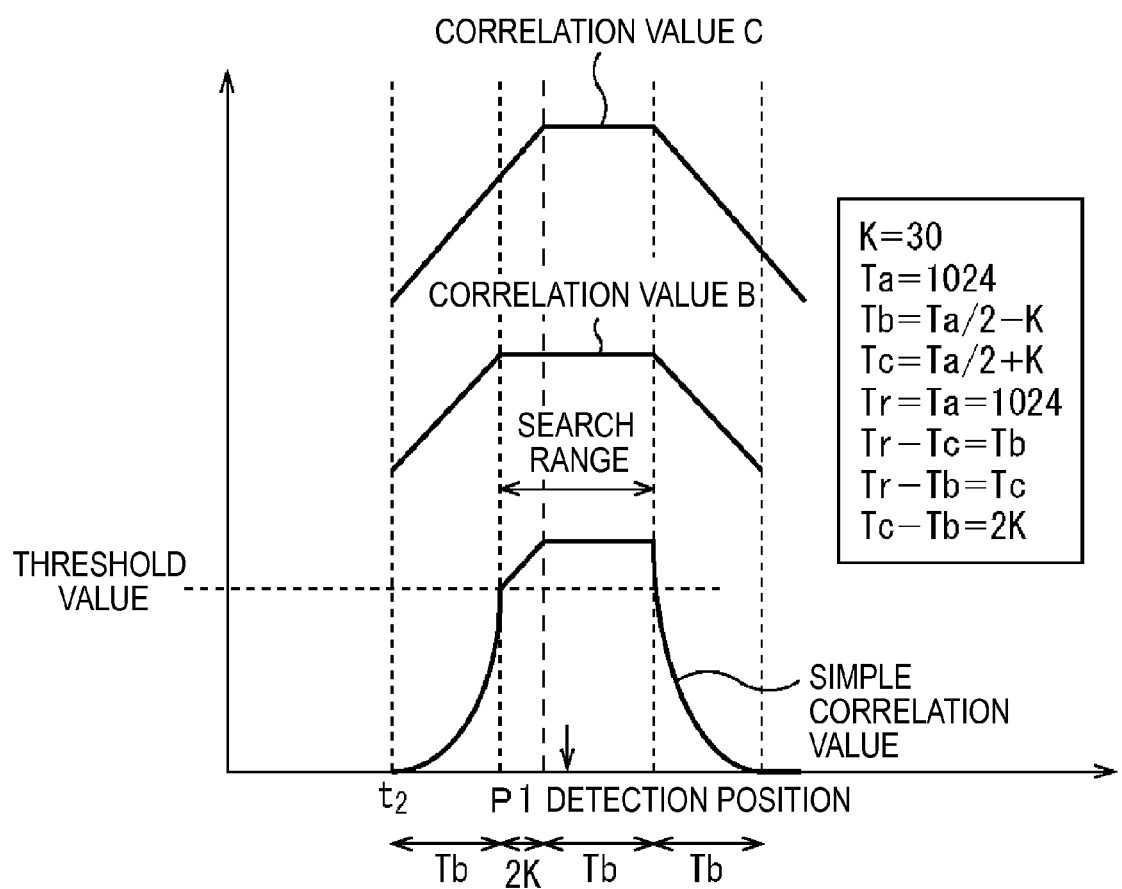
FIG. 10 is a diagram illustrating an example of a simple correlation value obtained from a first correlation value C and a second correlation value B.

FIG. 10 is a diagram illustrating an example of a simple correlation value obtained from the first correlation value C and the second correlation value B in the correlation calculation unit 90 (the multiplier 99 of the correlation calculation unit 90).

As described with reference to FIG. 8, in the correlation calculation unit 90, the first correlation value C is delayed in the delay circuit 95 so that supply of the first correlation value C obtained from the P1 signal and the second correlation value B of the multiplier 99 simultaneously starts, and then the first correlation value C is supplied to the multiplier 99.

That is, the first correlation value C and the second correlation value B are supplied to the multiplier 99 when increase start timings are identical.

As a result, the simple correlation value obtained by multiplying the first correlation value C and the second correlation value B in the multiplier 99 is illustrated in FIG. 10.

That is, the simple correlation value increases nonlinearly from time $t_2$ (FIG. 9) during the length $T_b$ of the duplicate portion B, and subsequently increases at a predetermined slope during a time $2K=T_c$-$T_b$. The simple correlation value increases at the predetermined slope during the time $2K=T_c$-$T_b$, is subsequently (substantially) constant during the length $T_b$ of the duplicate portion B, and subsequently decreases nonlinearly during the length $T_b$ of the duplicate portion B.

In the correlator 71 in FIG. 8, the simple correlation value is obtained in this way in the correlation calculation unit 90, and is supplied as a detection correlation value used to detect the position of the P1 signal included in the demodulated signal to the maximum searcher 72 (FIG. 7).

On the assumption that, for example, as a range (a range of the demodulated signal on the time axis) in which the detection correlation value equal to or greater than a threshold value appropriately determined in advance as a search range in which the P1 signal is a detection (search) target, the maximum searcher 72 detects a position at which the detection correlation value is the maximum as the position of the P1 signal within the search range based on the detection correlation value from the correlator 71.

<Relation Among Transmitted Signal, Received Signal, Gain of AGC 56, and Simple Correlation Value>

Figure 11:
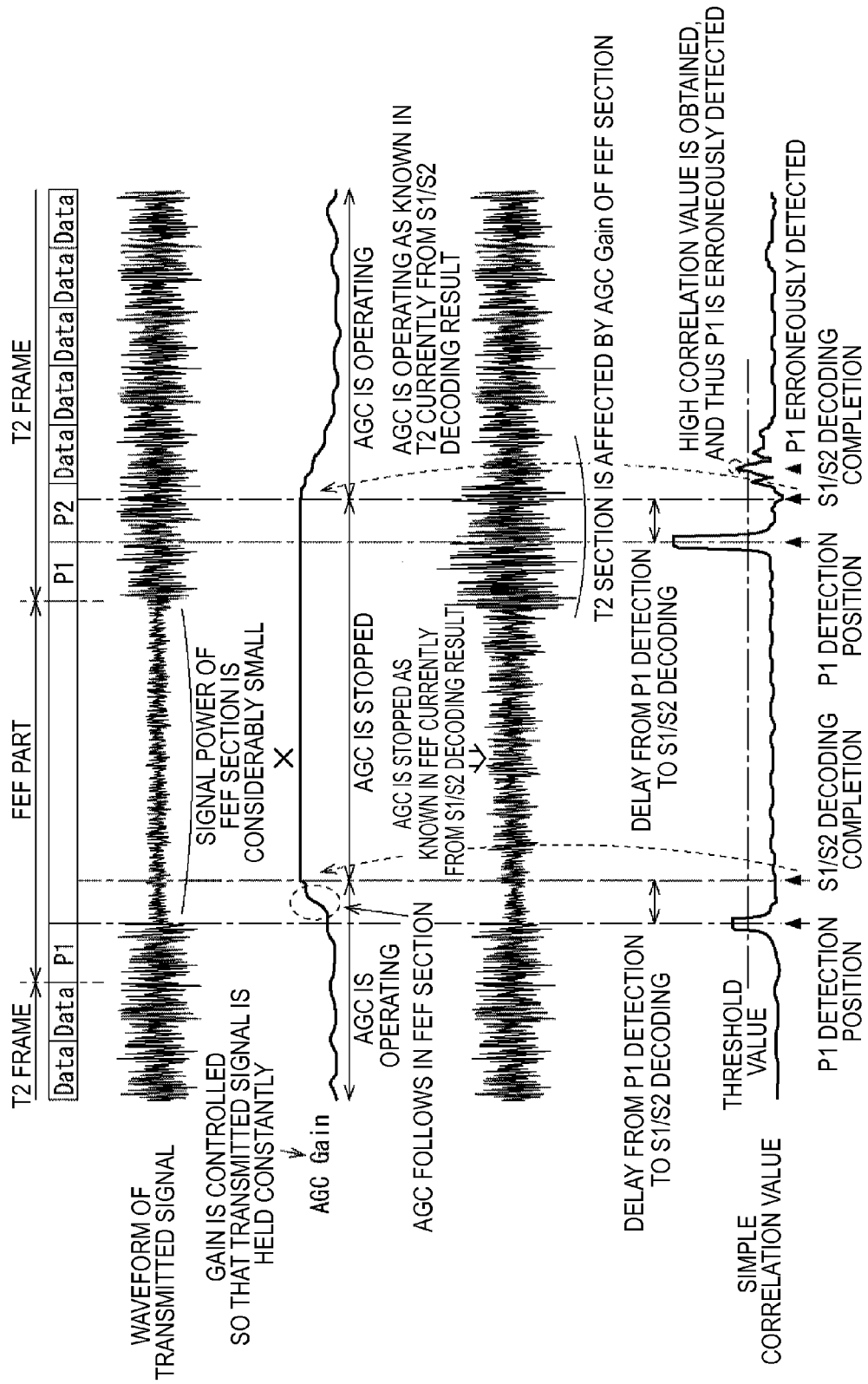
FIG. 11 is a diagram illustrating examples of a transmitted signal, a received signal, a gain, and a simple correlation value.

FIG. 11 is a diagram illustrating examples of a transmitted signal which is an RF signal of the DVB-T2 signal transmitted from the transmission device 1 (FIG. 3), a received signal obtained by receiving the transmitted signal from the transmission device 1 in the reception device 2 (FIG. 6), for example, an IF signal (after power adjustment) output by the A-to-D conversion unit 55, the gain (AGC gain) of the AGC 56, and the simple correlation value obtained by the correlation calculation unit 90 of the correlator 71 (FIG. 8).

In FIG. 11, a T2 frame and an FEF part are present together in a transmitted signal which is the DVB-T2 signal.

Power of a section of the FEF part (hereinafter also referred to as an FEF section) (accurately, a section excluding the section of the head P1 signal in the FEF section) is considerably less than power in a section of the T2 frame (hereinafter also referred to as a T2 section).

In FIG. 11, in the T2 section, the AGC 56 is operating and the gain of a received signal (adjustment of the power of the received signal) is controlled so that the power of the received signal obtained by receiving the transmitted signal is constant.

In FIG. 11, according to DVB-T2 Implementation Guidelines (Non-Patent Literature 1), the AGC 56 is stopped in the FEF section and the gain is held at a constant value immediately before the stop.

As described above, whether the received signal obtained by receiving the transmitted signal in which the T2 frame and the FEF part are present together is one of the T2 frame and the FEF part can be recognized by decoding the T2 frame or the P1 signal at the head of the FEF part in the P1 decoding processing unit 59 and referring to the S1 and S2 signals included in the P1 signal.

When the P1 signal is decoded to obtain the S1 and S2 signals, a given time is necessary for a process such as FFT calculation in the FFT calculation unit 73 (FIG. 7).

Accordingly, until the S1 and S2 signals are obtained from a time which is the position of the P1 signal indicated by the P1 detection flag output by the maximum searcher 72 (FIG. 7), that is, until the S1 and S2 signals are obtained after the detection of the P1 signal, a given delay time is present. Thus, in the FEF section, it is difficult to stop the AGC 56 accurately.

For this reason, in FIG. 11, the gain of the AGC 56 (FIG. 6) follows the power of the FEF part of which the power is considerably small immediately after the P1 signal at the head of the FEF section. Thereafter, the AGC 56 stops and the gain is held at a value considerably greater than a value proper for the T2 frame.

In this case, the power adjustment unit 54 (FIG. 6) adjusts the received signal of the FEF part of which the power is considerably small so that the power of the received signal becomes power appropriate to some extent by a gain held at a large value.

However, the power adjustment unit 54 performs power adjustment on the received signal in a subsequent T2 frame by the gain held at the large value until the AGC 56 resumes the operation. For this reason, the received signal of the T2 frame in which the power of the head is considerably large is sometimes supplied from the power adjustment unit 54 to the P1 decoding processing unit 59 via the A-to-D conversion unit 55 and the orthogonal demodulation unit 57.

In this case, in the P1 decoding processing unit 59, the simple correlation value is obtained in the correlator 71 in FIG. 8 using the received signal (the demodulated signal) in which the power is considerably large. The simple correlation value near the position of the P1 signal at the head of the T2 section immediately after the FEF section is sometimes considerably greater than the simple correlation value near the position of the P1 signal at the head of the FEF section.

For this reason, even when a local peak occurs due to thermal noise or the like in the simple correlation value, the local peak is also considerably large and exceeds the threshold value for detecting the P1 signal. Thus, the P1 signal is sometimes erroneously detected.

In FIG. 11, the power in the FEF section is considerably less than the power in the T2 section. However, when the power in the FEF section is considerably greater than the power in the T2 section in contrast, the simple correlation value near the position of the P1 signal at the head of the T2 section immediately after the FEF section is considerably small and does not exceed the threshold value for detecting the P1 signal. Thus, erroneous detection in which the P1 signal is not detected sometimes occurs.

As described above, when the erroneous detection of the P1 signal occurs, it is difficult to accurately detect the frames (the T2 frame and the FEF part). Further, it is difficult to decode the T2 frame.

<Another Configuration Example of Correlator 71>

Figure 12:
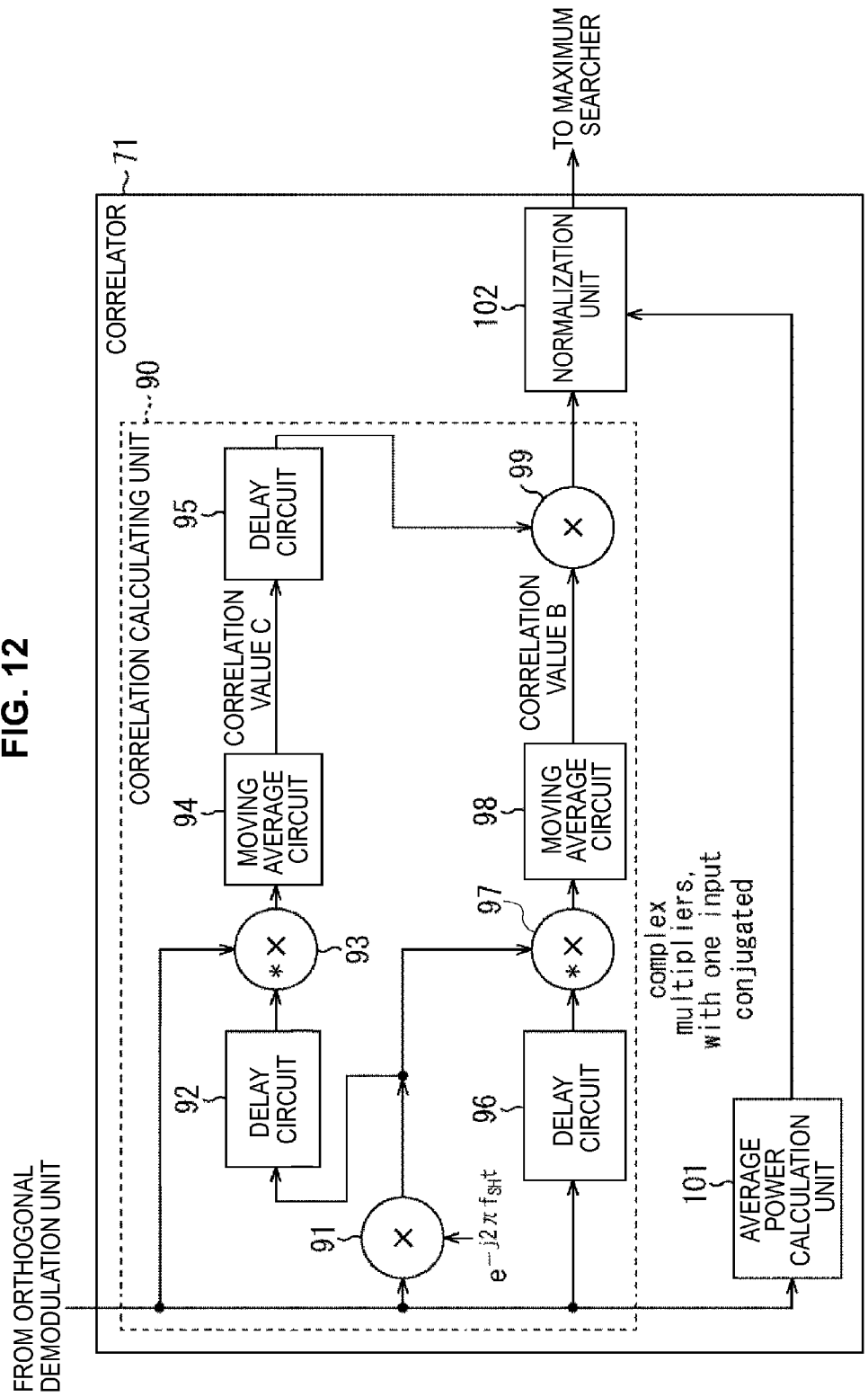
FIG. 12 is a block diagram illustrating another configuration example of the correlator 71.

FIG. 12 is a block diagram illustrating another configuration example of the correlator 71 in FIG. 7.

In FIG. 12, the same reference numerals are given to portions corresponding to the case of FIG. 8 and the description thereof will be appropriately omitted below.

In FIG. 12, the correlator 71 is common to the case of FIG. 8 in that the correlator 71 includes the correlation calculation unit 90. However, the correlator 71 in FIG. 12 is different from that in the case of FIG. 8 in that an average power calculation unit 101 and a normalization unit 102 are newly provided.

The average power calculation unit 101 is supplied with a demodulated signal (received signal) from the orthogonal demodulation unit 57 (FIG. 6).

The average power calculation unit 101 calculates average power of the demodulated signals from the orthogonal demodulation unit 57 and supplies the average power to the normalization unit 102.

The normalization unit 102 is supplied with the average power of the demodulated signals from the average power calculation unit 101 and is supplied with the simple correlation value from the correlation calculation unit 90.

The normalization unit 102 obtains a normalized value obtained by normalizing the simple correlation value by dividing the simple correlation value from the correlation calculation unit 90 by the average power of the demodulated signals from the average power calculation unit 101, and then supplies the normalized value as a detection correlation value to the maximum searcher 72 (FIG. 7).

In the maximum searcher 72, the position of the demodulated signal in which a normalized correction value exceeding a threshold value is the maximum is detected as the position of the P1 signal based on the normalized correction value serving as the detection correlation value from the normalization unit 102 of the correlator 71.

Here, in the average power calculation unit 101, for example, a section with the same length as the length of the P1 signal included in the demodulated signal can be adopted as a section of the demodulated signal used to obtain the average power of the demodulated signals. That is, the average power calculation unit 101 can sequentially calculate the average power of the demodulated signals using 2048 (=1024×2) samples of the demodulated signals.

In this case, it is possible to prevent an influence of the demodulated signal which is a signal other than the P1 signal on the calculation of the average power used to obtain the normalized correction value corresponding to the section of the P1 signal included in the demodulated signal.

In the average power calculation unit 101, the section of the demodulated signal used to obtain the average power of the demodulated signal is not particularly limited, but any section can be adopted.

Figure 13:
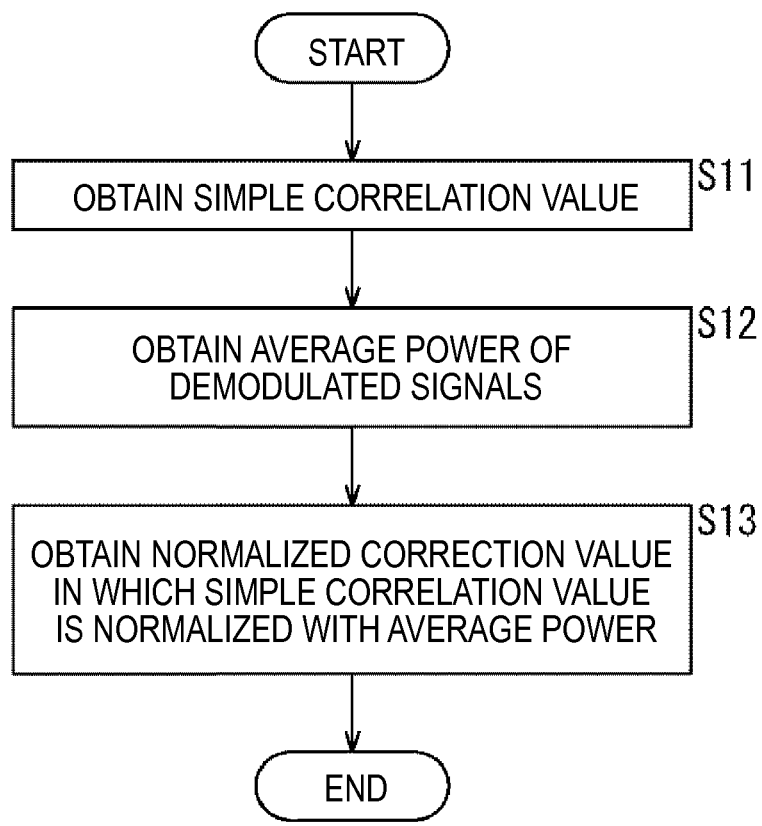
FIG. 13 is a flowchart for describing an example of a process of the correlator 71.

FIG. 13 is a flowchart for describing an example of a process of the correlator 71 in FIG. 12.

In step S11, the correlation calculation unit 90 obtains the simple correlation value which is a correlation value (a correlation value between the demodulated signal and the signal delayed by the time of the demodulated signal) between the demodulated signals from the orthogonal demodulation unit 57, and then supplies the simple correction value to the normalization unit 102. Then, the process proceeds to step S12.

In step S12, the average power calculation unit 101 obtains the average power of the demodulated signals from the orthogonal demodulation unit 57, and then supplies the average power to the normalization unit 102. Then, the process proceeds to step S13.

In step S13, the normalization unit 102 obtains the normalized correlation value obtained by normalizing the simple correlation value by dividing the simple correlation value from the correlation calculation unit 90 by the average power of the demodulated signals from the average power calculation unit 101, and then supplies the normalized correlation value as the detection correlation value to the maximum searcher 72 (FIG. 7). Then, the process ends.

The normalized correlation value obtained by normalizing the simple correlation value with the average power of the demodulated signals is a value within a given range irrespective of the power of the demodulated signal (received signal). Therefore, by detecting the P1 signal using the normalized correlation value as the detection correlation value, it is possible to prevent the erroneous detection of the P1 signal.

As the result obtained by preventing the erroneous detection of the P1 signal, for example, it is possible to accurately detect the frames (the T2 frame and the FEF part) from the demodulated signal in which the T2 frame and the FEF part are present together.

Any one of the process of obtaining the simple correlation value in step S11 and the process of obtaining the average power of the demodulated signal in step S12 may be performed earlier or both of these processes may be simultaneously performed.

<Description of Computer to which the Present Technology is Applied>

Next, the above-described series of processes can be performed by hardware or may also be performed by software. When the series of processes is performed by software, a program configuring the software is installed in a microcomputer or the like.

Figure 14:
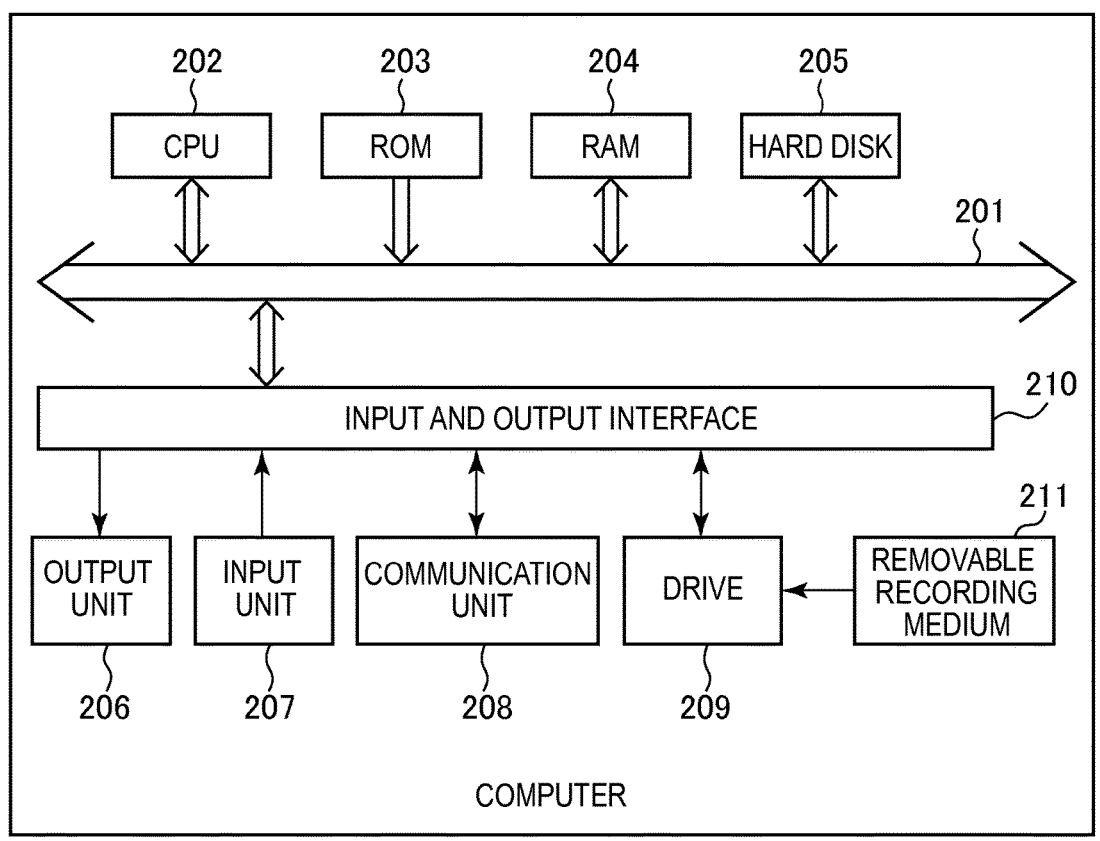
FIG. 14 is a block diagram illustrating a configuration example of an embodiment of a computer to which the present technology is applied.

Thus, FIG. 14 is a block diagram illustrating a configuration example of an embodiment of a computer in which a program executing the above-described series of processes is installed.

The program can be recorded in advance in a ROM 203 or a hard disk 205 serving as a recording medium internally included in the computer.

Alternatively, the program can be stored (recorded) in a removable recording medium 211. The removable recording medium 211 can be provided as so-called package software. Here, examples of the removable recording medium 211 include a flexible disk, a compact disc read-only memory (CD-ROM) disc, a magneto-optical (MO) disc, a digital versatile disc (DVD), a magnetic disk, and a semiconductor memory.

The program can be installed in the computer from the above-described removable recording medium 211 and can also be downloaded to the computer via a communication network or a broadcasting network and installed in the internally included hard disk 205. That is, for example, the program can be transferred in a wireless manner from a download site to the computer via a digital satellite broadcasting artificial satellite or can be transferred in a wired manner from a download site to the computer via a network such as a local area network (LAN) or the Internet.

The computer internally includes a central processing unit (CPU) 202. An input and output interface 210 is connected to the CPU 202 via a bus 201.

When a user inputs an instruction by manipulating an input unit 207 via the input and output interface 210, the CPU 202 accordingly executes the program stored in the read-only memory (ROM) 203. Alternatively, the CPU 202 loads the program stored in the hard disk 205 to a random access memory (RAM) 204 and executes the program.

Thus, the CPU 202 performs a process according to the above-described flowchart or a process performed by the configuration of the above-described block diagram. Then, for example, the CPU 202 outputs the processing result from an output unit 206, transmits the processing unit from a communication unit 208, or records the processing result in the hard disk 205 via the input and output interface 210 as necessary.

The input unit 207 is configured to include a keyboard, a mouse, and a microphone. The output unit 206 is configured to include a liquid crystal display (LCD) or a speaker.

Here, in the present specification, processes performed according to the program by the computer may not necessarily be performed chronologically in the order described in the flowchart. That is, processes performed according to the program by the computer also include processes (for example, parallel processes or processes by objects) performed in parallel or individually.

The program may be processed by a single computer (processor) or may be distributed and processed by a plurality of computers.

In the present specification, a system means a collective of a plurality of constituent elements (devices, modules (components), and the like) and all of the constituent elements may or may not be in the same casing. Accordingly, a plurality of devices accommodated in separate casings and connected via a network and a single device in which a plurality of modules are accommodated in a single casing are all systems.

Embodiments of the present technology are not limited to the above-described embodiments, but can be modified in various forms within the scope of the present technology without departing from the gist of the present technology.

For example, the steps described in the above-described flowchart can be performed by a single device and can also be shared and performed by a plurality of devices.

When a single step includes a plurality of processes, the plurality of processes included in the single step can be performed by a single device and can also be shared and performed by a plurality of devices.

The present technology can be applied when a preamble signal such as the P1 signal is detected and can also be applied when a signal other than a preamble signal is detected.

Here, a signal to be detected in the present technology may be a predetermined signal in which an original signal and a duplicate signal obtained from a copy of at least a part of the original signal are disposed.

The duplicate signals may not all necessarily be the original signal and may not necessarily be subjected to a frequency shift as in the duplicate portions C and B of the P1 signal.

The present technology can be applied not only to terrestrial digital broadcast other than DVB-T2 but also to, for example, satellite broadcast, cable television broadcast, or other broadcast (communication) in which a predetermined signal and a transfer signal including a copy signal obtained from a copy of at least a part of a predetermined signal are transferred, instead of terrestrial digital broadcast.

Additionally, the present technology may also be configured as below.

<1>
A reception device including:
a correlation calculation unit configured to obtain a correlation value between received signals including a predetermined signal in which an original signal and a duplicate signal obtained from a copy of at least a part of the original signal are disposed;
an average power calculation unit configured to obtain average power of the received signals; and
a normalization unit configured to obtain a normalized correlation value obtained by normalizing the correlation value by the average power.
<2>
The reception device according to <1>,
wherein the duplicate signal is a signal obtained by performing a frequency shift on the copy of at least the part of the original signal, and
wherein the correlation calculation unit obtains a correlation value between the received signal and a frequency shift signal obtained by performing a frequency shift on the received signal in a manner that the duplicate signal is returned to a signal with an original frequency.
<3>
The reception device according to <1> or <2>, wherein the predetermined signal is a preamble signal.
<4>
The reception device according to any of <1> to <3>, wherein the average power calculation unit obtains average power in a section of the predetermined signal.
<5>
The reception device according to any of <1> to <4>, further including:
a search unit configured to search for a position of the predetermined signal based on the normalized correlation value.
<6>
A reception method including:
a correlation calculation step of obtaining a correlation value between received signals including a predetermined signal in which an original signal and a duplicate signal obtained from a copy of at least a part of the original signal are disposed;
an average power calculation step of obtaining average power of the received signals; and
a normalization step of obtaining a normalized correlation value obtained by normalizing the correlation value by the average power.
<7>
A program causing a computer to function as:
a correlation calculation unit configured to obtain a correlation value between received signals including a predetermined signal in which an original signal and a duplicate signal obtained from a copy of at least a part of the original signal are disposed;

an average power calculation unit configured to calculate average power of the received signals; and a normalization unit configured to obtain a normalized correlation value obtained by normalizing the correlation value by the average power.

REFERENCE SIGNS LIST 1 transmission device
2 reception device
3 communication path
11 P1 coding processing unit
12 data coding processing unit
13 orthogonal modulation unit
14 D-to-A conversion unit
15 frequency conversion unit
16 antenna
21 384-bit signal generation unit
22 DBPSK modulation unit
23 scramble unit
24 1K carrier generation unit
25 CDS table
26 IFF calculation unit
27 P1 signal generation unit
51 antenna
52 frequency conversion unit
53 local oscillation unit
54 power adjustment unit
55 A-to-D conversion unit
56 AGC
57 orthogonal demodulation unit
58 local oscillation unit
59 P1 decoding processing unit
60 data decoding processing unit
61 output unit
71 correlator
72 maximum searcher
73 FFT calculation unit
74 CDS correlator
75 decoding unit
90 correlation calculation unit
91 frequency shifter
92 delay circuit
93 multiplier
94 moving average circuit
95, 96 delay circuit
97 multiplier
98 moving average circuit
99 multiplier
101 average power calculation unit
102 normalization unit
201 bus
202 CPU
203 ROM
204 RAM
205 hard disk
206 output unit
207 input unit
208 communication unit
209 drive
210 input and output interface
211 removable recording medium

The invention claimed is:

1. A reception device, comprising:
    an analog-to-digital convertor (ADC) circuit configured to receive signals and convert the received signals; and
    one or more processors coupled to the ADC circuit, wherein the one or more processors are configured to:
        obtain a gain to hold power of the received signals at a constant value based on the converted signals;
        adjust the power of the received signals based on the obtained gain and feed back the adjusted power to the ADC circuit;
        generate, based on the adjusted power, a correlation value between the received signals which include a determined signal, wherein the determined signal includes an original signal and a duplicate signal, and wherein the duplicate signal is obtained from a copy of at least a part of the original signal;
        obtain average power of the received signals; and
        output a normalized correlation value which is generated by normalization of the correlation value based on the average power.

2. The reception device according to claim 1, wherein the duplicate signal is obtained by a frequency shift on the copy of at least the part of the original signal, and
    wherein the one or more processors are further configured to obtain the correlation value between the received signals and a frequency shift signal obtained by the frequency shift on the received signals such that the duplicate signal is returned to an original frequency.

3. The reception device according to claim 1, wherein the determined signal is a preamble signal.

4. The reception device according to claim 1, wherein the one or more processors are further configured to obtain the average power in a section of the determined signal.

5. The reception device according to claim 1, wherein the one or more processors are further configured to search for a position of the determined signal based on the normalized correlation value.

6. A reception method, comprising:
    in a reception device that includes one or more processors coupled to an analog-to-digital convertor (ADC) circuit:
        receiving signals and converting the received signals by the ADC circuit;
        obtaining a gain for holding power of the received signals at a constant value based on the converted signals;
        adjusting the power of the received signals based on the obtained gain and feeding back the adjusted power to the ADC circuit;
        generating, based on the adjusted power, a correlation value between the received signals including a determined signal, wherein the determined signal includes an original signal and a duplicate signal, and wherein the duplicate signal is obtained from a copy of at least a part of the original signal;
        obtaining average power of the received signals; and
        outputting a normalized correlation value which is generated by normalizing the correlation value based on the average power.

7. A non-transitory computer-readable storage medium having stored thereon, computer-executable instructions, which when executed by a computer, cause the computer to execute operations, the operations comprising:
    receiving signals and converting the received signals by an analog-to-digital convertor (ADC) circuit;
    obtaining a gain for holding power of the received signals at a constant value based on the converted signals;

adjusting the power of the received signals based on the obtained gain and feeding back the adjusted power to the ADC circuit;

generating, based on the adjusted power, a correlation value between the received signals including a determined signal, wherein the determined signal includes an original signal and a duplicate signal, wherein the duplicate signal is obtained from a copy of at least a part of the original signal;

obtaining average power of the received signals; and outputting a normalized correlation value which is generated by normalizing the correlation value based on the average power.

8. The reception device according to claim 1, wherein the converted signals include an intermediate frequency (IF) signal, and wherein the obtained gain is based on the IF signal.

\* \* \* \* \*